United States Patent [19]
Smith et al.

[11] Patent Number: 5,388,002
[45] Date of Patent: Feb. 7, 1995

[54] BIRD RESISTANT LENS

[76] Inventors: Thomas V. Smith, 350 Jadito Trail; Daniel L. Hogg, 285 E. Kiowa, both of Flagstaff, Ariz. 86001

[21] Appl. No.: 69,777

[22] Filed: Jun. 1, 1993

[51] Int. Cl.⁶ .................................................. G02B 3/00
[52] U.S. Cl. ...................................... 359/642; 52/101; 359/507; 362/257
[58] Field of Search ............... 359/507, 642, 710, 896; 362/257; 52/101

[56] References Cited
U.S. PATENT DOCUMENTS 4,498,733  2/1985  Flanagan ........................ 359/531

Primary Examiner—Scott J. Sugarman

[57] ABSTRACT

A bird resistant lens for preventing a light from becoming fouled and obscured by bird droppings. The lens is provided with an unstable wobble member mounted to the lens by a spring. The spring supports the wobble member in such an manner so as to provide an area that a bird cannot perch upon. The wobble member includes a gutter and drain holes to channel water over the lens and further includes light dispersing ridges to improve the light's visibility.

5 Claims, 4 Drawing Sheets

U.S. Patent    Feb. 7, 1995    Sheet 1 of 4    5,388,002
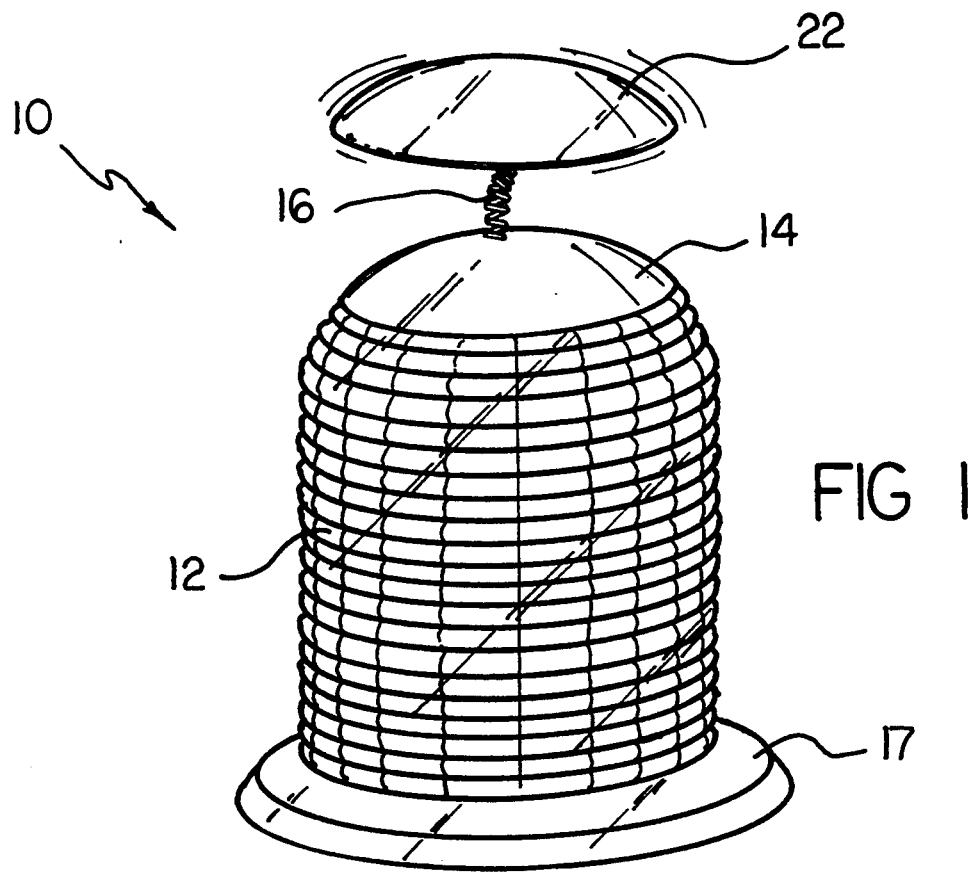
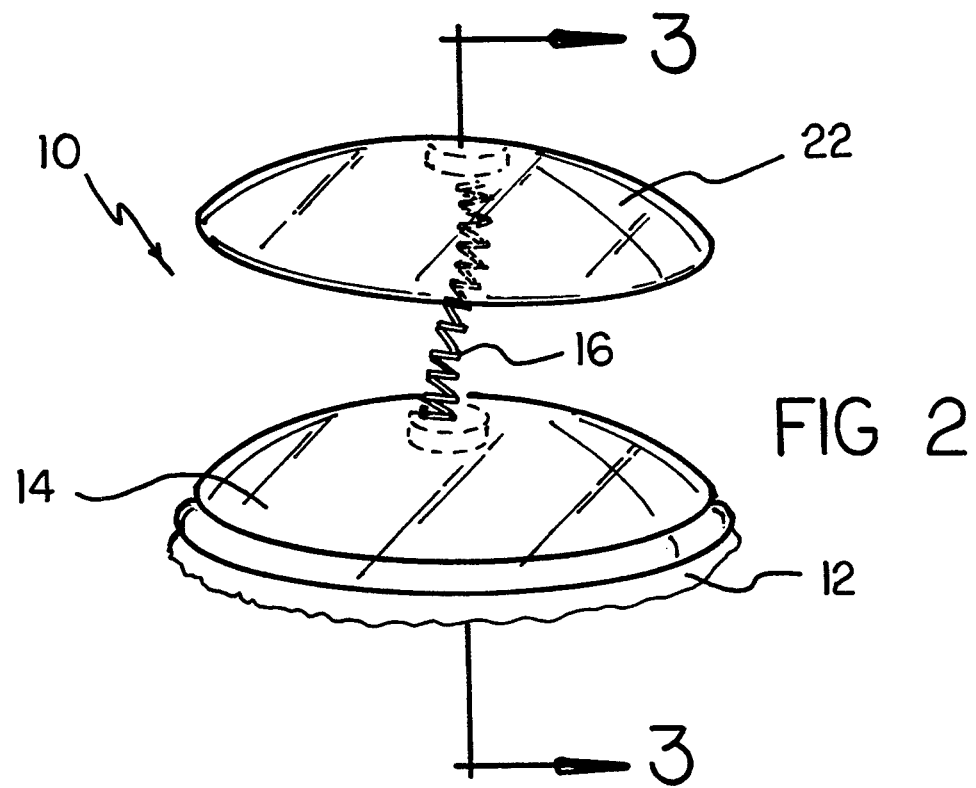

BIRD RESISTANT LENS

BACKGROUND OF THE INVENTION

1. Field of the Invention

The present invention relates to lights and more particularly pertains to lenses which may be utilized for preventing a light from becoming fouled and obscured by bird droppings.

2. Description of the Prior Art

The use of a light with a lens is known in the prior art. More specifically, lights with lenses heretofore devised and utilized for the purpose of providing light are known to consist basically of familiar, expected and obvious structural configurations, notwithstanding the myriad of designs encompassed by the crowded prior art which have been developed for the fulfillment of countless objectives and requirements.

For example, U.S. Pat. No. 3,567,917 describes an inset runway light for collecting the light generated by a light source and elevating and bending the light rays so that the emitted light hugs the runway in a prescribed pattern and direction.

U.S. Pat. No. 3,771,120 illustrates an airport beacon unit which includes an omnidirectional or wide angle flashing lamp for aiding pilot location of an airport runway threshold, and a directional flashing lamp for guiding the final approach to the runway.

While the aforementioned patents serve to accomplish their respective objectives and requirements, none of the above patents provides a light with a lens that is operable to prevent the light from becoming fouled and obscured by bird droppings.

In this respect, the bird resistant lens according to the present invention substantially departs from the conventional concepts and designs of the prior art, and in so doing provides a bird resistant lens apparatus primarily developed for the purpose of preventing a light from becoming fouled and obscured by bird droppings.

SUMMARY OF THE INVENTION

In view of the foregoing disadvantages inherent in the known types of lights now present in the prior art, the present invention provides a new bird resistant lens construction wherein the same can be utilized for preventing a light from becoming fouled and obscured by bird droppings. As such, the general purpose of the present invention, which will be described subsequently in greater detail, is to provide a new bird resistant lens apparatus which has many of the advantages of the light and lens apparatuses mentioned heretofore and many novel features that result in a bird resistant lens which is not anticipated, rendered obvious, suggested, or even implied by any of the prior art light and lens apparatuses, either alone or in any combination thereof.

To attain this, the present invention essentially comprises a bird resistant lens for preventing a light from becoming fouled and obscured by bird droppings. The lens is provided with an unstable wobble member mounted to the lens by a spring. The spring supports the wobble member in such a manner so as to provide an area that a bird cannot perch upon. The wobble member includes a gutter and drain holes to channel water over the lens and further includes light dispersing ridges to improve the light's visibility.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bird resistant lens apparatus which has many of the advantages of the lights mentioned heretofore and many novel features that result in a bird resistant lens which is not anticipated, rendered obvious, suggested, or even implied by any of the prior art lights, either alone or in any combination thereof.

It is another object of the present invention to provide a new bird resistant lens which may be easily and efficiently manufactured and marketed.

It is a further object of the present invention to provide a new bird resistant lens which is of a durable and reliable construction.

An even further object of the present invention is to provide a new bird resistant lens which is susceptible of a low cost of manufacture with regard to both materials and labor, and which accordingly is then susceptible of low prices of sale to the consuming public, thereby making such bird resistant lenses economically available to the buying public.

Still yet another object of the present invention is to provide a new bird resistant lens which provides in the apparatuses and methods of the prior art some of the advantages thereof, while simultaneously overcoming some of the disadvantages normally associated therewith.

Still another object of the present invention is to provide a new bird resistant lens which may be utilized for covering a light while simultaneously preventing a bird from perching on the light.

Yet another object of the present invention is to provide a new bird resistant lens that may be easily attached to existing structures without a substantial modification thereof.

Even still another object of the present invention is to provide a new bird resistant lens that will not substantially negatively interfere with a radiation of light therefrom.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a bird resistant lens comprising the present invention.

FIG. 2 is an enlarged perspective view of a portion of the present invention.

DESCRIPTION OF THE PREFERRED EMBODIMENTS

Figure 3:
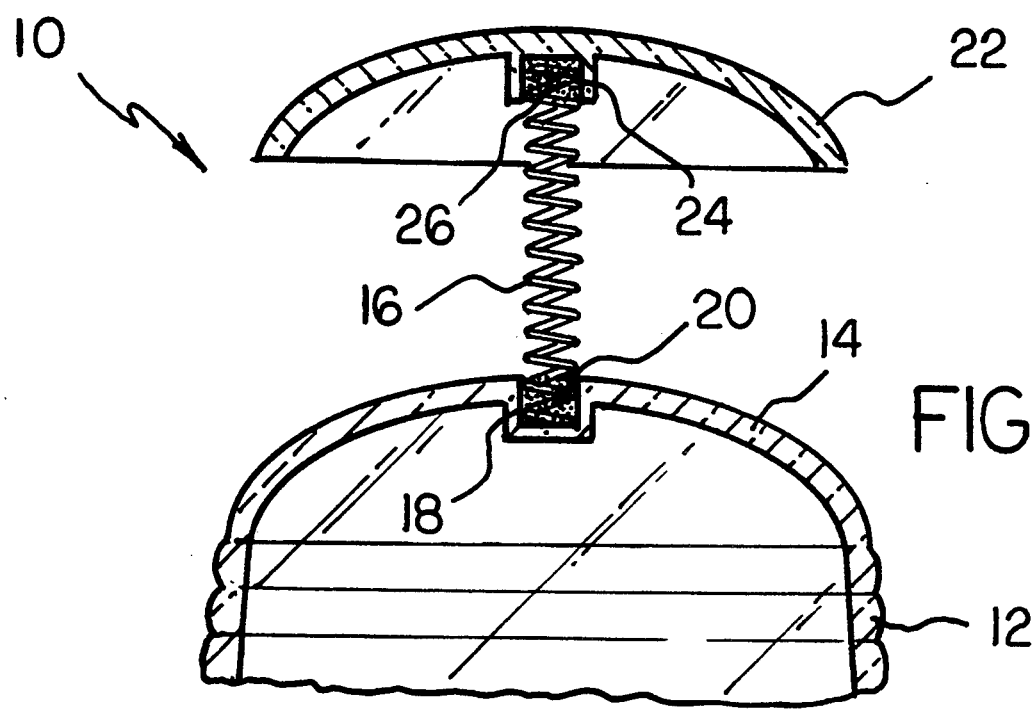
FIG. 3 is a cross section taken along line 3—3 of FIG. 2.

With reference now to the drawings, and in particular to FIGS. 1-3 thereof, a new bird resistant lens embodying the principles and concepts of the present invention and generally designated by the reference numeral 10 will be described.

More specifically, it will be noted that the bird resistant lens 10 comprises a substantially cylindrical lamp housing 12 that is sized to receive a portion of a conventional lamp (not shown) therein. The lamp housing 12 is made from any substantially transparent or translucent material so that radiated light from the lamp may readily pass therethrough. The lamp housing 12 includes both a top member 14 which receives and supports a coil spring 16 thereon, and a lower flange 17 that provides a conventional means for mounting the lens 10 to a lamp. The coil spring 16 is positioned within a cavity 18 which is integrally secured to the top member 14 in a well understood manner. The coil spring 16 is secured within the cavity by a conventional means such as glue 20.

The coil spring 16 projects upward from the top member 14 and supports a wobble member 22 thereon. The wobble member 22 includes a further cavity 24 that receives and secures thereto the coil spring 16 in a substantially similar manner as described for the top member 14. The coil spring 16 is also secured to the further cavity 24 by glue 26 as was utilized in the cavity 18 of the top member 14. The wobble member 22 is substantially partially hemispherically shaped and is formed out of any conceivable material that is translucent or transparent, notwithstanding the great number of materials applicable thereto.

Figure 4:
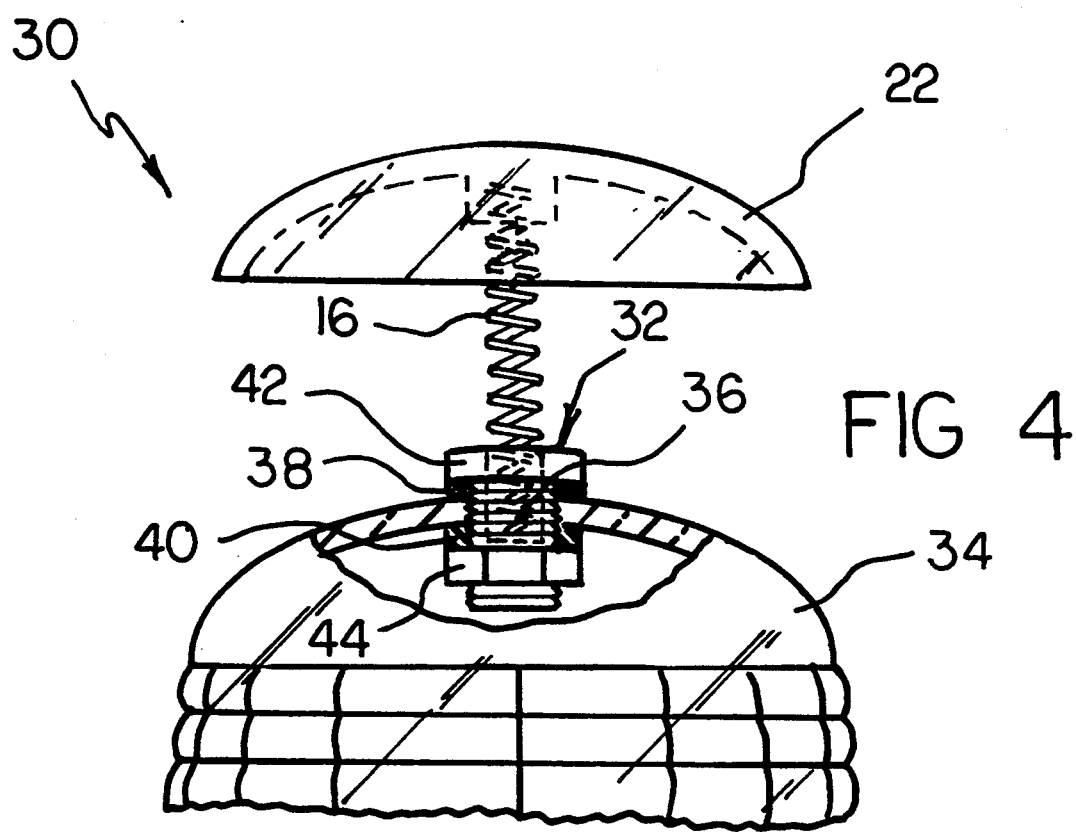
FIG. 4 is a front elevation view of a second embodiment of the present invention.
Figure 5:
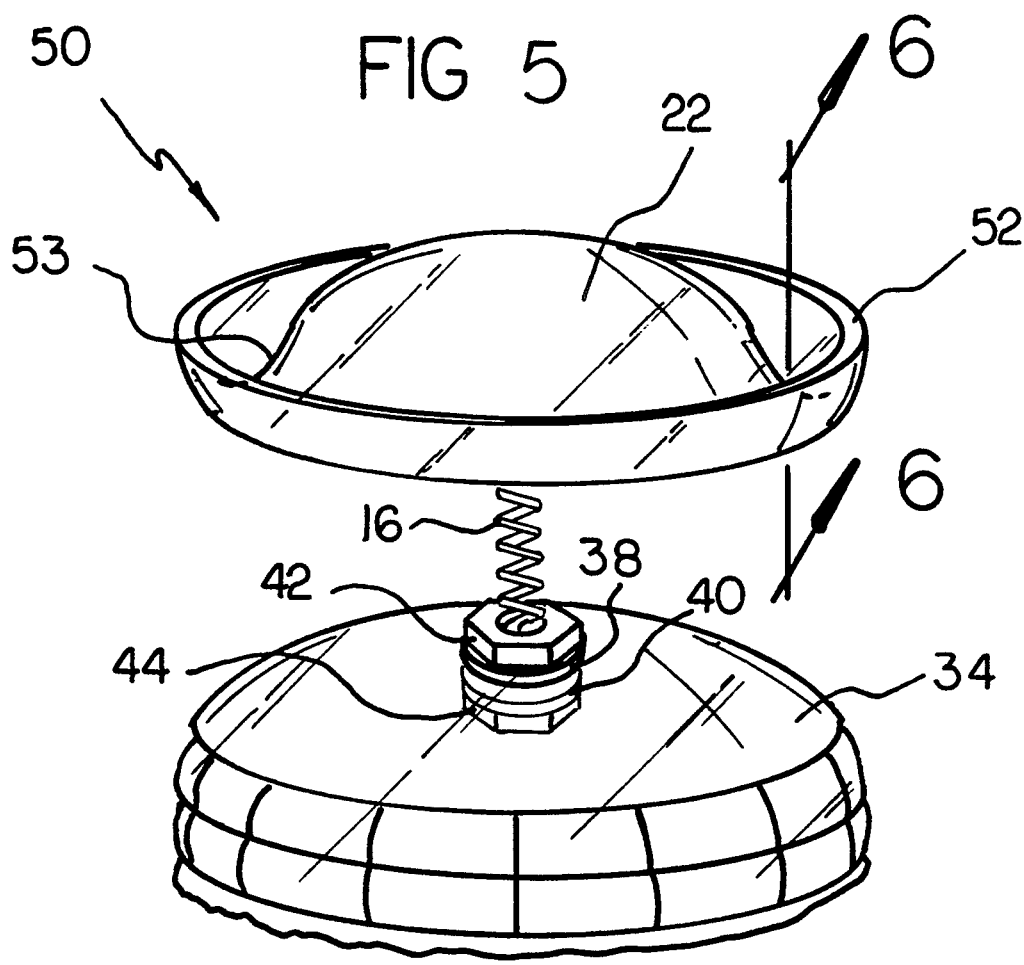
FIG. 5 is a perspective view of a third embodiment of the present invention.

A second embodiment of the present invention as generally designated by the reference numeral 30 can be seen in FIG. 4. It can be seen that the second embodiment 30 includes substantially all of the features of the foregoing embodiment 10 and further comprises an attachment assembly 32 that allows the wobble member 22 to be secured to an existing lamp's lens 34. The attachment assembly 32 comprises a hollow threaded rod 36 into which a portion of the coil spring 16 may be captured and secured thereto by a conventional means, such as glue (not shown). The threaded rod 36 may be secured to the lamp's lens 34 by positioning the threaded rod within an aperture (not labeled) in the lens and securing it thereto with a pair of 0-rings 38, 40 and a pair of nuts 42, 44 as can be seen in FIG. 4.

In use, a bird is discouraged from perching atop the wobble member 22 because of its unstable support and its arcuate shape. A weight of the bird positioned upon the wobble member 22 will cause the wobble member to tilt, thus creating an inclination that the bird may not remain upon. Because a bird cannot perch upon the lamp, fouling of the lamp from bird droppings is substantially reduced.

Figure 6:
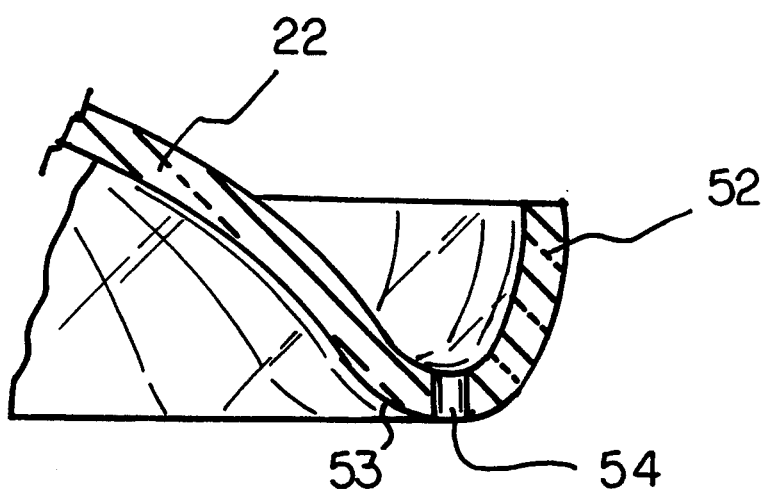
FIG. 6 is a cross section view taken along line 6—6 of FIG. 5.

To reduce fouling from bird droppings falling from birds flying overhead, a third embodiment 50 of the present invention comprises substantially all of the features of the foregoing embodiments 10, 30 and further comprises a gutter 52. The gutter is integrally or otherwise circumferentially secured to a perimeter 53 of the wobble member 22. The gutter 52 is operable to retain any airborne droppings produced by flying birds and to channel such droppings away from a light. The gutter 52 includes a plurality of drain holes 54 that are positioned around the perimeter 53 of the wobble member 22 as best seen in FIGS. 6 and 8.

Figure 7:
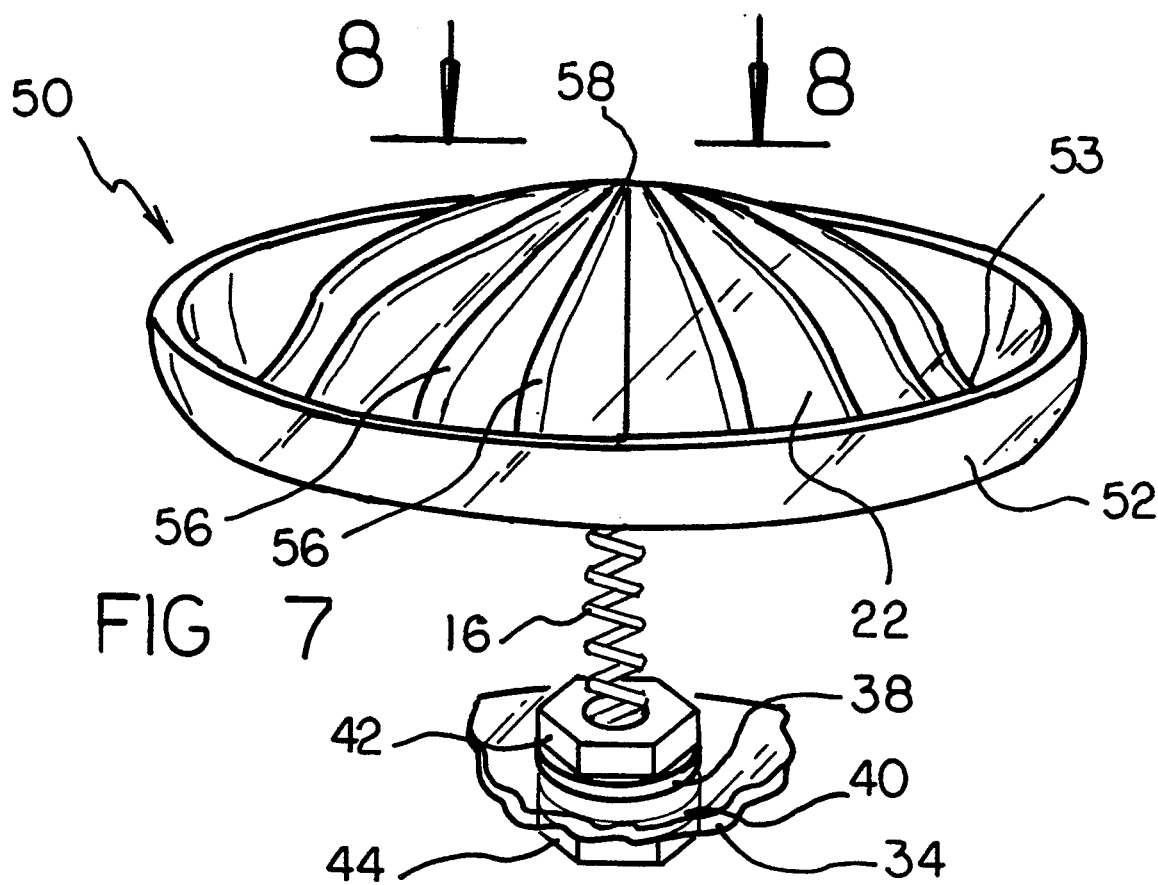
FIG. 7 is a perspective view of the third embodiment of the invention.
Figure 8:
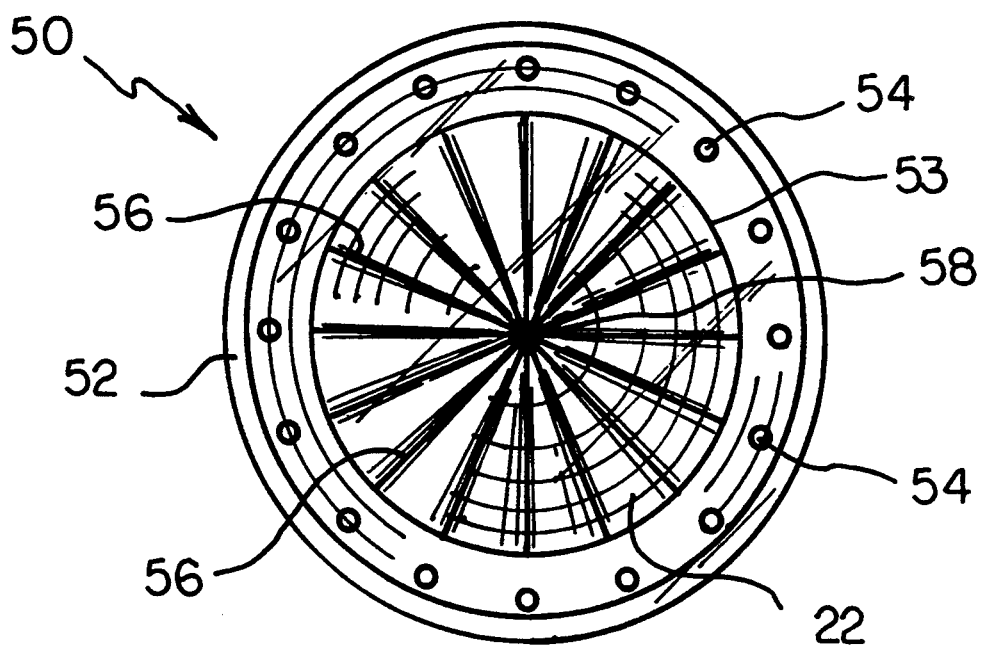
FIG. 8 is a top plan view as seen along from line 8—8 of FIG. 7.

To increase a visibility of radiated light, the third embodiment 50 further comprises a plurality of light dispersing ridges 56 that extend radially from a center point 58 of the wobble member 22 to the perimeter 53 as illustrated in FIGS. 7-8. The light dispersing ridges 56 cause light passing through the wobble member 22 to radiate therefrom at a plurality of angles, thereby increasing dispersion of such light and substantially increasing visibility thereof.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bird resistant lens comprising:

a lamp housing for receiving and at least partially enclosing a lamp, said lamp housing being substantially translucent so as to allow light radiated from said lamp to pass therethrough, said lamp housing having a top member integrally formed therewith;

a coil spring having first and second ends;

mounting means for mounting said first end of said spring to said top member of said lamp housing such that said spring projects upwardly from said lamp housing; and, a wobble member mounted to said second end of said coil spring such that said wobble member will move and tilt relative to said lamp housing upon a perching of a bird upon the wobble member, thereby precluding said bird from remaining on said wobble member.

2. The bird resistant lens as recited in claim 1, wherein said top member of said lamp housing has an aperture extending therethrough, and further wherein said mounting means comprises a threaded rod mounted to said first end of said spring, said threaded rod extending through said aperture, with a pair of nuts threaded onto said threaded rod so as to capture a portion of said top member of said lamp housing between said nuts to fixedly, removably mount said threaded rod thereto.

3. The bird resistant lens as recited in claim 2, wherein said wobble member comprises a substantially translucent, hemispherically shaped member.

4. The bird resistant lens as recited in claim 3, wherein said wobble member further comprises a gutter extending around a perimeter of said wobble member, said gutter having a plurality of drain holes extending therethrough.

5. The bird resistant lens as recited in claim 4, wherein said wobble member further comprises a plurality of light dispersing ridges radially extending from a center point of said wobble member to said perimeter thereof, said ridges being operable to cause light passing through said substantially translucent wobble member to radiate therefrom at a plurality of angles, thereby increasing dispersion of said light and increasing visibility thereof.

* * * * *